United States Patent [19]
Nishikawa

[11] Patent Number: 4,539,861
[45] Date of Patent: Sep. 10, 1985

[54] REGULATING APPARATUS FOR A STEERING SHAFT

[75] Inventor: Masumi Nishikawa, Toyoake, Japan

[73] Assignee: Aisin Seiki Kabushiki Kaisha, Kariya, Japan

[21] Appl. No.: 472,209

[22] Filed: Mar. 4, 1983

[30] Foreign Application Priority Data

Mar. 9, 1982 [JP] Japan ................................. 57-36768

[51] Int. Cl.³ .......................... B62D 1/18; G05G 5/16
[52] U.S. Cl. ......................................... 74/493; 74/531; 280/775; 403/104; 403/374; 411/21; 411/340
[58] Field of Search .................. 74/493, 531; 280/278, 280/279, 287, 775; 403/104, 374; 411/21, 55, 79, 340, 344, 345, 346

[56] References Cited

U.S. PATENT DOCUMENTS

| 265,747 | 10/1882 | Briggs | 403/374 |
| 1,133,947 | 3/1915 | Fischer | 411/344 |
| 2,192,484 | 3/1940 | Bryan | 411/21 X |
| 2,280,662 | 4/1942 | Pawsat | 411/79 X |
| 2,787,485 | 4/1957 | Frisell | 403/104 |
| 2,903,904 | 9/1959 | Mackie | 74/493 |
| 3,258,987 | 7/1966 | Zeigler et al. | 74/493 |
| 4,402,236 | 9/1983 | Nishikawa | 74/493 |

FOREIGN PATENT DOCUMENTS

54-159932  12/1979  Japan ...................................... 74/493

Primary Examiner—Allan D. Herrmann
Attorney, Agent, or Firm—Oblon, Fisher, Spivak, McClelland & Maier

[57] ABSTRACT

A regulating apparatus for a steering shaft of a steering wheel including an outer shaft rotatably mounted on a casing member, an inner shaft axially slidably mounted within the outer shaft and rotatable for transmitting rotation torque generated by rotation of the steering wheel wherein the steering wheel is mounted on the inner shaft, a locking member axially slidably mounted within the outer shaft and pivotably mounted on the inner shaft for selective engagement with the outer shaft and a control rod operatively connected to the inner shaft and the locking member for rotating the locking member so as to pressingly engage the locking member against the outer shaft.

6 Claims, 5 Drawing Figures

REGULATING APPARATUS FOR A STEERING SHAFT

BACKGROUND OF THE INVENTION

1. Field of the Invention

The present invention relates generally to a steering shaft and, more particularly, to a regulating apparatus for a steering shaft of a steering wheel.

2. Description of the Prior Art

In a conventional regulating apparatus for a steering shaft which can axially adjust the position of the steering wheel, locking means are disposed between an inner shaft and an outer shaft and rotational torque of the steering wheel is transmitted between the inner shaft and the outer shaft through the locking means or a key portion formed on the inner shaft. The locking means may include a locking member which is mounted on the inner shaft and is connected to the outer shaft by frictional force, or by an engagement member such as a ratchet gear.

However, while the locking means construction is simple, the connecting force is weak such that the inner shaft is slidably moved upon impact loading. Also, where an engagement member is utilized, the connecting force is sufficient but stepless adjustment thereof is impossible. Further, the construction of the engagement member is relatively complex with a corresponding increase in the cost of production of the regulating apparatus.

SUMMARY OF THE INVENTION

An object of the present invention is to provide an improved regulating apparatus for a steering shaft which can more assuredly lock the inner shaft to the outer shaft with a frictional force when an impact load occurs.

Another object of the present invention is to provide an improved regulating apparatus for a steering shaft which can be steplessly adjusted with a desirable connecting force.

In accordance with the present invention, a regulating apparatus is provided for a steering shaft which includes an outer shaft rotatably mounted on a casing member, an inner shaft axially slidably mounted with the outer shaft and rotatable for transmitting torque generated by rotation of a steering wheel wherein the steering wheel is mounted on the inner shaft, a locking member axially slidably mounted within the outer shaft and pivotably mounted on the inner shaft for selective engagement with the outer shaft, and a control rod operatively connected to the inner shaft and the locking member for rotating the locking member so as to pressingly engage the locking member against the outer shaft.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
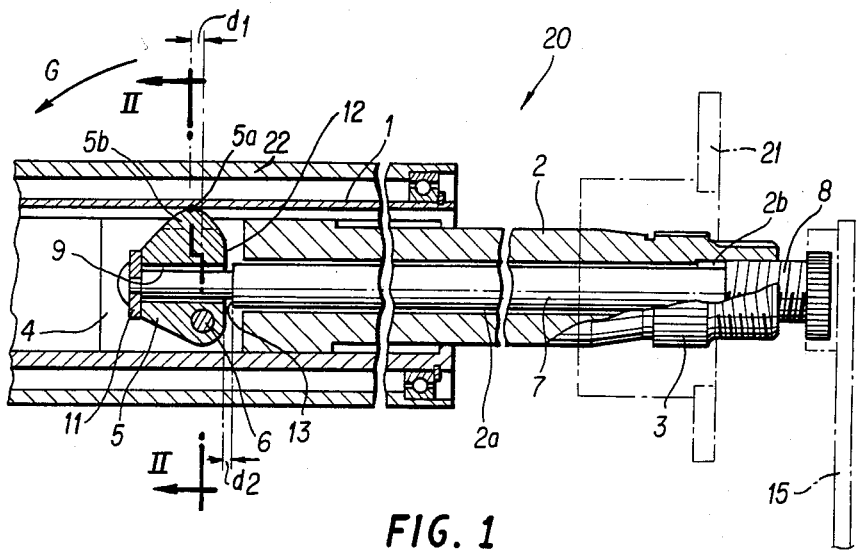
FIG. 1 is a sectional side view which shows a first embodiment of a regulating apparatus for a steering shaft of a steering wheel according to the present invention.
Figure 2:
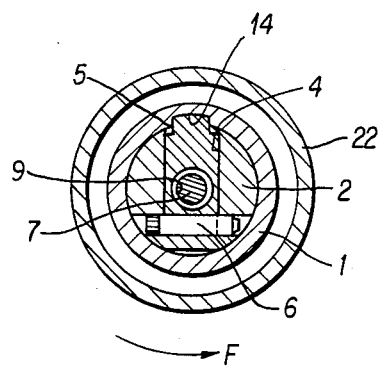
FIG. 2 is a sectional view taken in the plane along lines II—II in FIG. 1.

Referring now to FIGS. 1 and 2, reference numeral 20 denotes a regulating apparatus for a steering shaft which can axially regulate a steering wheel 21. A hollow outer shaft 1 is rotatably mounted on a case or casing member 22 secured to the vehicle body (not shown) and is also operatively connected to a steering gear (not shown). An inner shaft 2 is inserted into the outer shaft 1 and is axially slidable therein.

Figure 5:
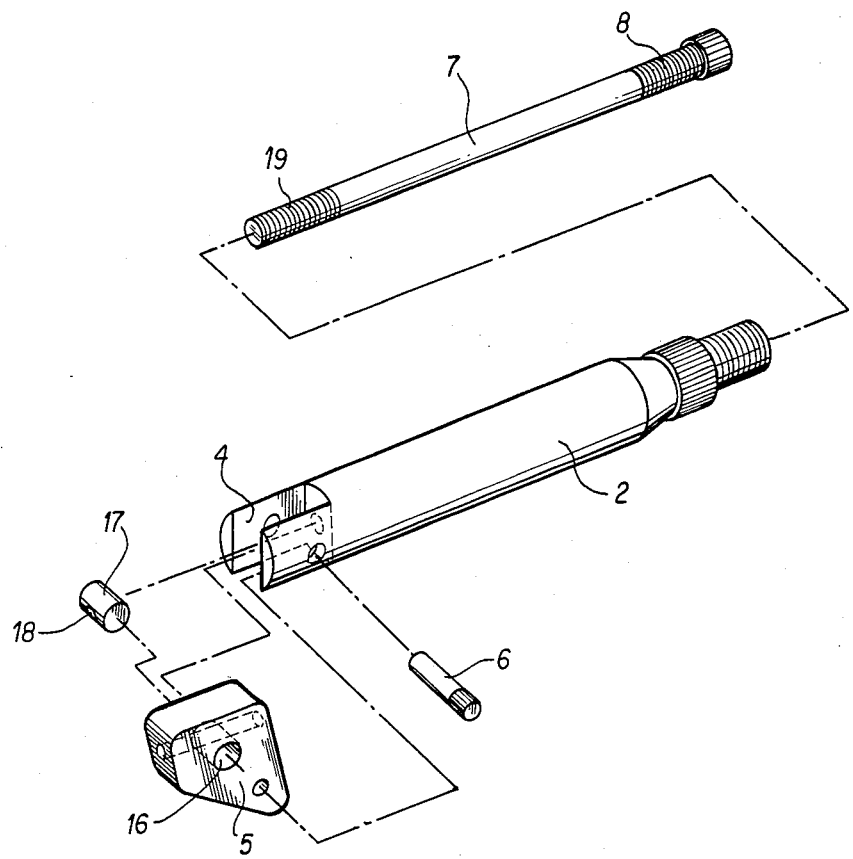
FIG. 5 is an exploded, perspective view of the embodiment shown in FIG. 3.

A serrated portion 3 is formed on the right end of the inner shaft 2 in FIG. 1 and the steering wheel 21 is mounted thereon. The left end of the inner shaft 2 in FIG. 1 is provided with a recess 4 as shown in FIG. 5 and a locking member 5 is inserted therein. The locking member 5 is pivotably mounted to the inner shaft 2 by a pin 6 at a position offset from the axis of the inner shaft 2.

A hole 2a is formed in the center portion of the inner shaft 2 and a control rod 7 is passed through the hole 2a. A counterclockwise threaded portion 8 is formed on the right end portion of the control rod 7 and is engaged with a threaded portion 2b formed in the hole 2a of the inner shaft 2. Further, on the left end portion of the control rod 7, which is passed through a hole 9 of the locking member 5, a collar 11 is secured as shown in FIG. 1. A very small clearance $\delta_2$ is formed between a shoulder portion 13 of the control rod 7 and the right surface 12 of the locking member 5 such that the left surface of the locking member 5 is in abutment with the collar 11 in FIG. 1. Thus, the locking member 5 is movable around the pin 6 between the collar 11 and the shoulder portion 13.

A groove 14 is axially formed on the inner surface of the outer shaft 1 and a frictional portion 5b of the locking member 5 is engaged with the groove 14. A frictional point 5a of the frictional portion 5b of the locking member 5 which is pressed on the base surface of the groove 14 of the outer shaft 1, is slightly leftwardly shifted by the length of clearance $\delta_1$ from the center point of the pin 6 in FIG. 1. Reference numeral 15 denotes a lever and such is secured to the right end of the control rod 7 in FIG. 1.

Operation of the regulating apparatus according to the present invention is as follows. In the situation where steering wheel 21 is rotated, the inner shaft 2 is rotated in the same direction as steering wheel 21. Therefore, outer shaft 1 is also rotated in the same direction by the locking member 5 mounted on the inner shaft 2 and the rotational torque of steering wheel 21 is transmitted to the steering gear (not shown).

In the situation where lever 15 is rotated in the direction of arrow F in FIG. 2 in order to axially regulate the steering wheel 21 from the locking state in FIG. 1, the control rod 7 is moved leftwardly by counterclockwise threaded portion 8. Accordingly, the shoulder portion 13 abuts the locking member 5 so that the locking member 15 is pressed and rotated around the pin 6 in the direction of arrow G in FIG. 1. By this rotation of the locking member 5, as the frictional point 5a of the locking member 5 is separated from the base surface of the groove 14, the inner shaft 2 becomes axially slidable within outer shaft 1.

In the situation where lever 15 is rotated in the opposite direction of the arrow F in FIG. 2, the control rod 7 is moved rightwardly by the counterclockwise threaded portion 8 in FIG. 1. Therefore, as the collar 11 abuts the locking member 5 the locking member 5 is rotated in the opposite direction denoted by arrow G in FIG. 1. By this rotation of the locking member 5, the frictional point 5a of the locking member 5 is pressed against the base surface of the groove 14 of the outer shaft 1 so that the inner shaft 2 becomes fixed within the outer shaft 1 due to frictional force engagement. Thus, a locking state shown in FIG. 1 is obtained at any desired axial position.

In the locking state, in case an impact load is experienced leftwardly against the steering wheel 21 in FIG. 1, the inner shaft 2 is moved leftwardly. However, since clearance $\delta_2$ is formed between the control rod 7 and locking member 5, locking member 5 is rotatable around the pin 6 even in the locking state. Accordingly, a sufficient connecting force is provided between the locking member 5 and the outer shaft 1 and the locking member 5 is rotated around the frictional point 5a of the locking member 5 in the clockwise direction in FIG. 1 in accordance with leftward movement of the pin 6 with the inner shaft 2. By this rotation of the locking member 5 around the frictional point 5a, the center point of the pin 6 axially approaches the frictional point 5a. Thus, since the frictional point 5a is shifted from the center point of the pin 6 by distance $\delta_1$, the frictional point 5a is even more strongly pressed against the base surface of the groove 14. Accordingly, as the frictional force increases, leftward movement of the inner shaft 2 within the outer shaft 1 is progressively diminished to the point of being discontinued.

Figure 3:
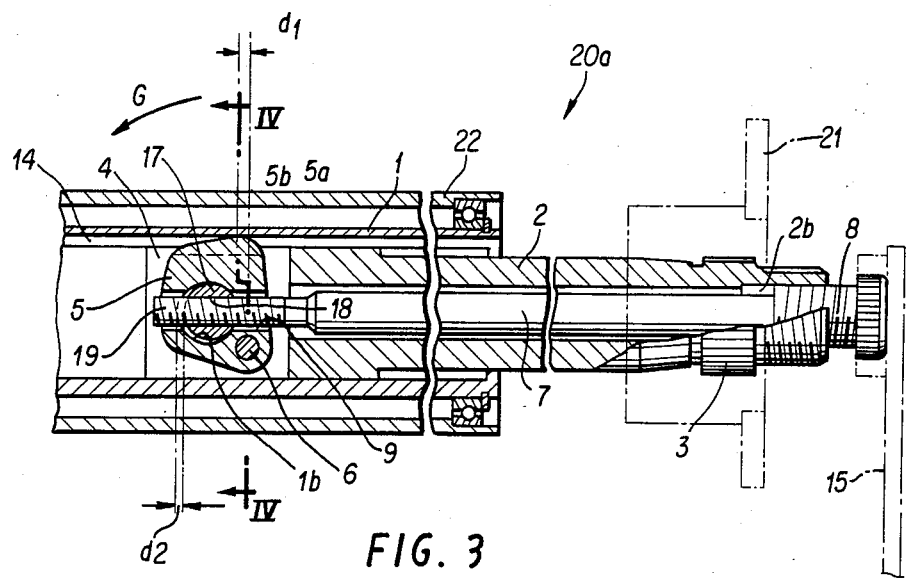
FIG. 3 is a sectional side view which shows a second embodiment of a regulating apparatus for a steering shaft of a steering wheel according to the present invention.
Figure 4:
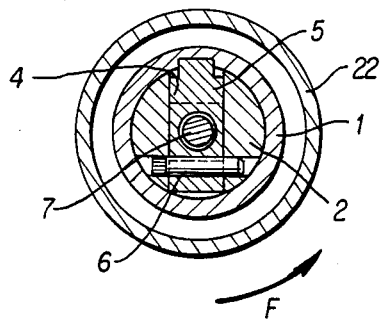
FIG. 4 is a sectional view taken in the plane along lines IV—IV of FIG. 3.

A second embodiment 20a according to the present invention is shown in FIGS. 3, 4 and 5. In this embodiment, a nut 17 is used instead of the collar 11 in the first embodiment shown in FIG. 1. A cylindrical hole 16 is formed in the locking member 5 at a right angle with the hole 9 and the longitudinal axis of control rod 7 or inner shaft 2 and a cylindrically formed nut 17 is inserted into the cylindrical hole 16. The nut 17 is provided with a clockwise threaded hole 18 and the clockwise threaded hole 18 is screw fitted with a clockwise threaded portion 19 formed on the left end of the control rod 7 in FIG. 3. As the diameter of the cylindrical hole 16 is larger than the diameter of the nut 17, a very small clearance $\delta_2$ is formed between the nut 17 and the cylindrical hole 16 of the locking member 5 at the left side of the nut 17 as shown in FIG. 3.

The operation of the second embodiment 20a will now be described. In the situation where lever 15 is rotated in the direction of arrow F in FIG. 4 in order to axially regulate steering wheel 21 from the locking state in FIG. 3, the control rod 7 is moved leftwardly by counterclockwise threaded portion 8, and moreover, the nut 17 is moved leftwardly by clockwise threaded portion 19. Therefore, nut 17 is immediately moved leftwardly and abuts against the cylindrical hole 16 of the locking member 5 at the left side of the nut 17 so that the locking member 5 is pressed and rotated around the pin 6 in the direction of arrow G in FIG. 3. By this rotation of locking member 5, as the frictional point 5a of the locking member 5 is separated from the base surface of the groove 14, the inner shaft 2 becomes axially slidable within outer shaft 1.

In the situation where lever 15 is rotated in the opposite direction of the arrow F in FIG. 4, the control rod 7 is moved rightwardly by the counterclockwise threaded portion 8 and the nut 17 is also moved rightwardly by the clockwise threaded portion 19. Therefore, nut 17 is immediately moved rightwardly and abuts against the cylindrical hole 16 of the locking member 5 at the right side of the nut 17 so that the locking member 5 is pressed and rotated around the pin 6 in the opposite direction of arrow G in FIG. 3. Due to this rotation of the locking member 5, as the frictional point 5a of the locking member 5 is pressed against the base surface of the groove 14 of the outer shaft 1, the inner shaft 2 becomes fixed within the outer shaft 1 via frictional force. Thus, the locking state shown in FIG. 3 is obtainable at any axial position.

In the locking state in FIG. 3, in case an impact load occurs leftwardly against the steering wheel 21, the inner shaft 2 is moved leftwardly with the control rod 7. However, since the clearance $\delta_2$ is formed between the nut screwed with the control rod 7 and the hole 16 of the locking member 5, the locking member 5 is rotatable around the pin 6 even in the locking state. Accordingly, since sufficient connecting force is provided between the locking member 5 and the outer shaft 1, the locking member 5 is rotated around the frictional point 5a of the locking member 5 in the clockwise direction in FIG. 3 according to leftward movement of the pin 6 along with the inner shaft 2. Due to this rotation of the locking member 5 around the frictional point 5a, the center point of the pin 6 axially approaches the frictional point 5a. Thus, since the frictional point 5a is shifted from the center point of the pin 6 by the distance $\delta_1$, the frictional point 5a is more forcefully pressed against the base surface of the groove 14. As the frictional force increases, leftward movement of the inner shaft 2 within the outer shaft 1 is progressively diminished to the point of being discontinued.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A regulating apparatus for a steering shaft of a steering wheel, comprising:

an outer shaft rotatably mounted on a casing member;

an inner shaft axially slidably mounted within said outer shaft and rotatable for transmitting torque generated by rotation of said steering wheel wherein said steering wheel is mounted on said inner shaft;

a locking member axially slidably mounted within said outer shaft and pivotably mounted on said inner shaft for selective engagement with said outer shaft; and a control rod operatively connected to said inner shaft and said locking member for rotating said locking member so as to pressingly engage said locking member against said outer shaft wherein said locking member is pressed against said outer shaft at a point axially forwardly offset from a point where said locking member is pivotably mounted on said inner shaft and wherein said control rod and said locking member have a clearance formed therebetween such that upon an axial force being applied to said control rod, said control rod is slidable within said outer shaft and said engagement of said locking member with said outer shaft is increased.

2. A regulating apparatus for a steering shaft according to claim 1, wherein said inner shaft has a recess formed therein within which said locking member is pivotably mounted.

3. A regulating apparatus for a steering shaft according to claim 1, further comprising a first threaded portion formed in said inner shaft and a second threaded portion formed on an end portion of said control rod engageable with said first threaded portion.

4. A regulating apparatus for a steering shaft according to claim 1, wherein said outer shaft has a groove formed therein which is engageable with said locking member so as to selectively fix said inner shaft within said outer shaft upon rotation of said locking member.

5. A regulating apparatus for a steering shaft of a steering wheel, comprising:
   an outer shaft rotatably mounted on a casing member;
   an inner shaft axially slidably mounted within said outer shaft and rotatable for transmitting torque generated by rotation of said steering wheel wherein said steering wheel is mounted on said inner shaft;
   a locking member axially slidably mounted within said outer shaft and pivotably mounted on said inner shaft for selective engagement with said outer shaft wherein said control rod has a threaded end portion and wherein said locking member has a hole formed therein at a right angle to the longitudinal axis of said inner shaft, and further comprising a nut mounted in said hole, said nut having a threaded hole formed therein engageable with said threaded end portion of said control rod.

6. A regulating apparatus for a steering shaft according to claim 5, wherein said outer shaft has a groove formed therein which is engageable with said locking member so as to selectively fix said inner shaft within said outer shaft upon rotation of said locking member.

* * * * *